(12) United States Patent
Choi

(10) Patent No.: US 7,198,335 B2
(45) Date of Patent: Apr. 3, 2007

(54) METHOD AND SYSTEM FOR CONTROLLING REGENERATIVE BRAKING OF A FOUR WHEEL DRIVE ELECTRIC VEHICLE

(75) Inventor: Yong Kak Choi, Hwaseong (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 100 days.

(21) Appl. No.: 10/991,211

(22) Filed: Nov. 17, 2004

(65) Prior Publication Data

US 2005/0104445 A1   May 19, 2005

(30) Foreign Application Priority Data

Nov. 18, 2003   (KR) .................. 10-2003-0081854

(51) Int. Cl.
*B60T 8/64* (2006.01)
*B60K 17/356* (2006.01)

(52) U.S. Cl. ............... 303/152; 180/65.2; 180/244

(58) Field of Classification Search ........... 180/65.1, 180/65.2, 65.3–65.6, 165, 178, 242–244, 180/248; 303/152
See application file for complete search history.

(56) References Cited

U.S. PATENT DOCUMENTS

| 5,294,191 A | 3/1994 | Giorgetti et al. |
| 5,839,535 A * | 11/1998 | Arai ............... 180/197 |
| 6,059,064 A * | 5/2000 | Nagano et al. ..... 180/243 |
| 2005/0218717 A1* | 10/2005 | Nishina et al. ...... 303/152 |

FOREIGN PATENT DOCUMENTS

| DE | 19718378 A1 | 11/1997 |
| DE | 10012221 A1 | 10/2001 |
| JP | 2000-272361 | 3/2000 |

* cited by examiner

*Primary Examiner*—Pam Rodriguez
(74) *Attorney, Agent, or Firm*—Morgan Lewis & Bockius LLP

(57) ABSTRACT

Controlling regenerative braking of front and rear motors of a four wheel drive electric vehicle equipped with front and rear motors and a manual transmission having a clutch, based on whether the clutch is engaged or not.

8 Claims, 3 Drawing Sheets

METHOD AND SYSTEM FOR CONTROLLING REGENERATIVE BRAKING OF A FOUR WHEEL DRIVE ELECTRIC VEHICLE

CROSS-REFERENCE TO RELATED APPLICATIONS

This application claims priority to Korean patent Application No. 10-2003-0081854, filed on Nov. 18, 2003, the disclosure of which is incorporated fully herein by reference.

FIELD OF THE INVENTION

Generally, the present invention relates to an electric vehicle. More particularly, the present invention relates to control of braking of an electric vehicle.

BACKGROUND OF THE INVENTION

As is well known in the art, an electric vehicle utilizes electric energy stored in a battery for a power source. For enhancement of energy efficiency and mileage of such an electric vehicle, braking of the electric vehicle is usually controlled by a regenerative braking scheme such that some energy may be retrieved to electric energy during the braking.

An electric vehicle is usually provided with an automatic transmission or a continuously variable transmission (CVT). However, when a manual transmission is installed in an electric vehicle, a driver will manually operate a clutch, and accordingly, the driver will become more sensitive to changes in vehicle behavior caused by activation of regenerative braking. Therefore, an electric vehicle equipped with a manual transmission should be more precisely controlled in regenerative braking.

Furthermore, a powertrain of a four wheel drive scheme that is able to apply a driving force to both front and rear wheels has various intrinsic merits. An electric vehicle will also have such merits when a powertrain of the electric vehicle is provided in a four wheel drive scheme. When a manual transmission is provided in an electric vehicle along with a powertrain of a four wheel drive scheme, applicability of regenerative braking to front and rear wheels is substantially dependent on whether a driver operates the clutch.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

The present invention provides a method and a system for controlling regenerative braking of a four wheel drive electric vehicle equipped with front and rear motors and a manual transmission having non-limiting advantages of enhanced stability in control.

An exemplary method for controlling regenerative braking of a four wheel drive electric vehicle according to an embodiment of the present invention includes: determining whether the four wheel drive electric vehicle is braking; determining whether the clutch is engaged or disengaged when the four wheel drive electric vehicle is braking; and controlling regenerative braking of the front and rear motors based on whether the clutch is engaged or disengaged.

In a further embodiment, the controlling of regenerative, braking of the front and rear motors regeneratively brakes both the front and rear motors when the clutch is engaged.

In another further embodiment, the controlling of regenerative braking of the front and rear motors regeneratively brakes only the rear motor among the front and rear motors when the clutch is disengaged.

In a further embodiment, a regenerative braking force on the rear motor in the case of the clutch disengagement state is controlled to be less than a regenerative braking force on the rear motor when the clutch is engaged.

In another further embodiment, the control of regenerative braking of the front and rear motors includes: calculating a slip ratio of the rear wheel when the clutch is engaged; determining whether the slip ratio of the rear wheel is less than a reference slip ratio; and stopping regenerative braking of the rear motor when the slip ratio of the rear wheel is greater than the reference slip ratio.

In another further embodiment, the control of regenerative braking of the front and rear motors includes determining whether a vehicle speed becomes 0 (zero) during a braking operation of the four wheel drive electric vehicle. When the vehicle speed of the four wheel drive electric vehicle becomes 0, the regenerative braking of the rear motor is prevented until the clutch becomes engaged and the manual transmission is in a forward shift-speed.

An exemplary system for controlling regenerative braking of a four wheel drive electric vehicle according to an embodiment of the present invention is a system for controlling regenerative braking of a four wheel drive electric vehicle equipped with front and rear wheels and a brake apparatus for applying a mechanical braking force to the front and rear wheels.

Such an exemplary system for controlling regenerative braking of a four wheel drive electric vehicle includes: a front motor for applying both a driving force and a regenerative braking force to the front wheels; a rear motor for applying both a driving force and a regenerative braking force to the rear wheels; a manual transmission and a clutch interposed between the front motor and the front wheels; a clutch engagement detector for detecting engagement of the clutch; a brake operation detector for detecting operation of the brake apparatus; and a controller for controlling regenerative braking of the front and rear motors based on signals received from these detectors, The controller executes instructions for a method for controlling regenerative braking. The method including: determining whether the four wheel drive electric vehicle is braking; determining whether a clutch is engaged or disengaged when the four wheel drive electric vehicle brakes; and controlling regenerative braking of the front and rear motors based on whether the clutch is engaged or disengaged.

In a further embodiment, the controlling of regenerative braking of the front and rear motors may also regeneratively brake both the front and rear motors when the clutch is engaged.

In another embodiment, the controlling of regenerative braking of the front and rear motors regeneratively brakes only the rear motor of the front and rear motors when the clutch is disengaged.

In a further embodiment, the regenerative braking force on the rear motor when the clutch is disengaged is less than the regenerative braking force on the rear motor when the clutch is engaged.

In a further embodiment, a front wheel speed detector for detecting the wheel speed of the front wheel and a rear wheel speed detector for detecting the wheel speed of the rear wheel are further included. The control of regenerative braking of the front and rear motors includes: calculating a slip ratio of the rear wheel when the clutch is disengaged; determining whether the slip ratio of the rear wheel is less than a reference slip ratio; and stopping regenerative braking of the rear motor when the slip ratio of the rear wheel is greater than the reference slip ratio.

In a further embodiment, a shift-speed detector for detecting a shift-speed of the manual transmission is further included. Controlling the regenerative braking of the front and rear motors comprises determining whether a vehicle speed becomes 0 (zero) during a braking operation of the four wheel drive electric vehicle. When the vehicle speed of the four wheel drive electric vehicle becomes 0, the regenerative braking of the rear motor is prevented until the clutch becomes engaged and the manual transmission is in a forward shift-speed.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

An embodiment of the present invention will hereinafter be described in detail with reference to the accompanying drawings.

Figure 1:
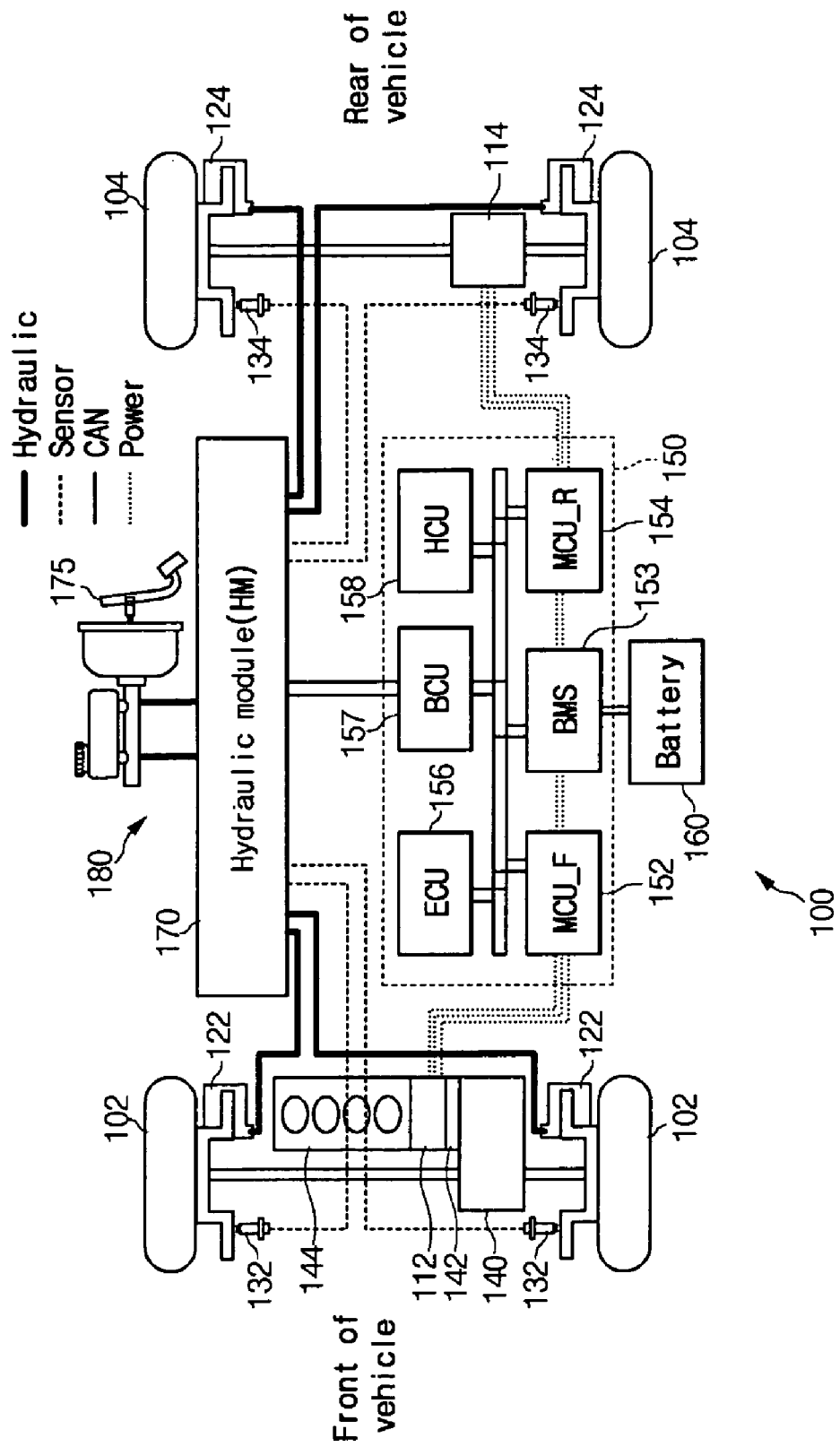
FIG. 1 is a schematic view of a system for controlling regenerative braking of a four wheel drive electric vehicle according to an embodiment of the present invention.
Figure 2:
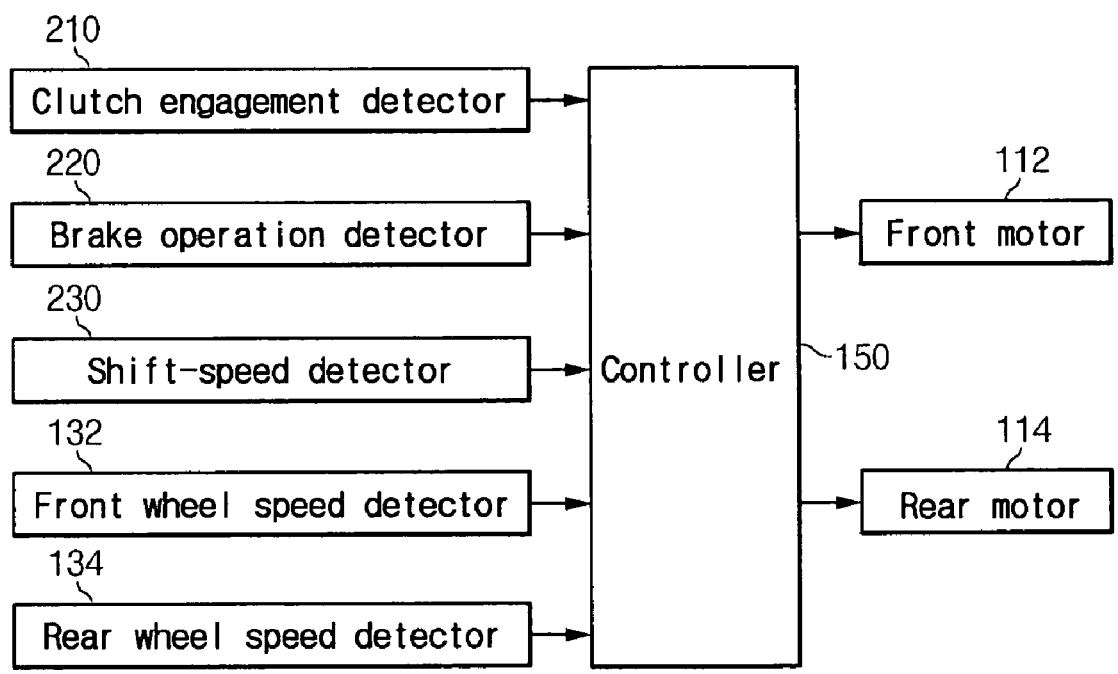
FIG. 2 is block diagram of a system for controlling regenerative braking of a four wheel drive electric vehicle according to an embodiment of the present invention.

FIG. 1 is a schematic view of a system for controlling regenerative braking of a four wheel drive electric vehicle according to an embodiment of the present invention, and FIG. 2 is block diagram of a system for controlling regenerative braking of a four wheel drive electric vehicle according to an embodiment of the present invention.

As shown in FIGS. 1 and 2, a four wheel drive electric vehicle 100 according to an embodiment of the present invention includes front and rear wheels 102 and 104 and a brake apparatus 180 for applying a mechanical braking force to the front and rear wheels 102 and 104.

FIG. 1 shows an electric vehicle of a specific type, i.e., a four wheel drive hybrid electric vehicle (called a 4WD-HEV hereinafter). However, the scope of the present invention should not be understood as limited thereto. The present invention may also be applicable to a pure electric vehicle other than a hybrid electric vehicle. In addition, the present invention may be applicable to both parallel type and series type hybrid electric vehicles.

A system for controlling regenerative braking of such a 4WD-HEV 100 according to an embodiment of the present invention, includes: a front motor 112 for applying both a driving force and a regenerative braking force to the front wheels 102; a rear motor 114 for applying both a driving force and a regenerative braking force to the rear wheels 104; a manual transmission 140 and a clutch 142 interposed between the front motor 112 and the front wheel 102; a clutch engagement detector 210 for detecting engagement of the clutch 142; a brake operation detector 220 for detecting operation of the brake apparatus 180; a front wheel speed detector 132 for detecting the wheel speed of the front wheel 102; a rear wheel speed detector 134 for detecting the wheel speed of the rear wheel 104; a shift-speed detector 230 for detecting the shift-speed of the manual transmission 140; and a controller 150 for controlling the regenerative braking of the front and rear motors 112 and 114 on the basis of the detectors 210, 220, 230, 132, and 134.

The clutch engagement detector 210 may be realized as, e.g., an on/off sensor disposed to a clutch pedal (not shown) for detecting operation of the clutch pedal (not shown). The brake operation detector 220 may be realized as, e.g., an on/off sensor disposed to a brake pedal 175 for detecting operation of the brake pedal 175. The front and rear wheel speed detectors 132 and 134 may be realized as, e.g., toothed rings and magnetic sensors. The shift-speed detector 230 may be realized as, e.g., a sensor for detecting the lever position of a shift-lever (not shown) for manual shifting of the manual transmission 140. The controller 150 may be realized by one or more processors activated by a predetermined program. The predetermined program may be programmed to perform each step of a method according to an embodiment of this invention.

In more detail, the brake apparatus 180 includes front wheel brake apparatus 122 for applying a hydraulic braking force to the front wheel 102 in accordance with operation of the brake pedal 175, rear wheel brake apparatus 124 for applying a hydraulic braking force to the rear wheel 104 in accordance with operation of the brake pedal 175, and a hydraulic module (HM) 170 for distributing the hydraulic braking force in accordance with the operation of the brake pedal 175 to the front and rear wheel brake apparatuses 122 and 124.

The controller 150 includes: a front motor controller (MCU_F) 152 for controlling the front motor 112; a rear motor controller (MCU_R) 154 for controlling the rear motor 114; a battery management system (BMS) 153 for controlling a battery 160; an engine control unit (ECU) 156 for controlling an engine 144 of the 4WD-HEV 100; a brake control unit (BCU) 157 for controlling hydraulic braking force; and a hybrid control unit (HCU) 158 for comprehensive controlling of the 4WD-HEV 100. The controllers 152 and 154, management system 153, and control units 156, 157, and 158 communicate with one another through a controller area network (CAN) communication scheme.

A method for controlling regenerative braking of a four wheel drive electric vehicle according to an embodiment of the present invention is hereinafter described in detail.

Figure 3:
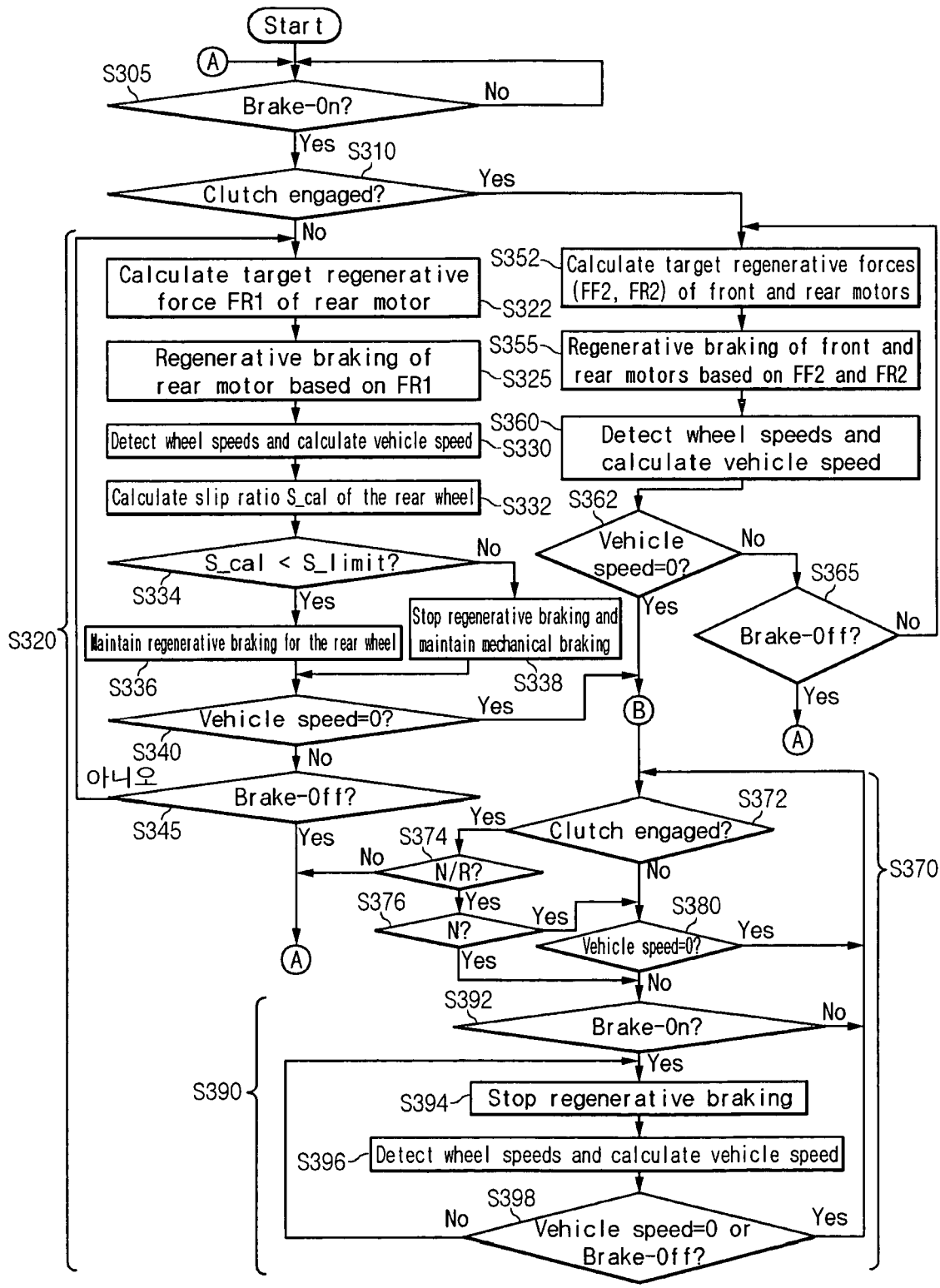
FIG. 3 is a flowchart showing a method for controlling regenerative braking of a four wheel drive electric vehicle according to an embodiment of the present invention.

FIG. 3 is a flowchart showing a method for controlling regenerative braking of a four wheel drive electric vehicle according to an embodiment of the present invention. Firstly at step S305, the controller 150 determines whether the 4WD-HEV 100 is brake-operated. When the 4WD-HEV 100 is brake-operated, the controller 150 subsequently determines a clutch engagement/disengagement state at step S310. Then, at step S320, the controller 150 controls regenerative braking of the front and rear motors 112 and 114 on the basis of the clutch engagement/disengagement state.

In more detail, at the step S320, the controller 150 regeneratively brakes both the front and rear motors 112 and 114, when the clutch is engaged, and regeneratively brakes only the rear motor 114 when the clutch is disengaged. The controller 150 controls a regenerative braking force FR1 of the rear motor 114 when the clutch is disengaged, to be less than the regenerative braking force FR2 of the rear motor 114 when the clutch is engaged.

Such control of regenerative braking at the step S320 will be hereinafter described in further detail. When the clutch 142 is not engaged (S310-no), that is, when power transmission between the front motor 112 and the front wheel 102 is interrupted, the controller 150 calculates, at step S322, a target regenerative force FR1 of the rear motor 114. At the step S322, a target regenerative braking force of the front motor 112 is not calculated.

The target regenerative braking force FR1 of the rear motor 114 is calculated to be less than a target regenerative braking force of the rear motor 114 when the clutch is engaged. The target regenerative braking force of the rear motor 114 when the clutch is engaged will be described later.

Vehicle behavior under braking may deteriorate when only a mechanical braking force is applied to the front wheel 102, but an excessive regenerative braking force, in addition to a mechanical braking force, is applied to the rear wheel 104. Therefore, such a deterioration of vehicle behavior is prevented by applying less regenerative braking force in the case where the clutch 142 is not engaged than in the case where the clutch 142 is engaged. Then at step S325, the controller 150 controls regenerative braking of the rear motor 114 on the basis of the calculated target regenerative braking force FR1.

Subsequently, at step S330, the controller 150 detects the rotation speed of each of the front and rear wheels 102 and 104 through the front and rear wheel speed detectors 132 and 134, and calculates a vehicle speed based thereon. Subsequently, at step S332, the controller 150 calculates a slip ratio S_cal of the rear wheel 104 from the vehicle speed and the rotation speeds of the wheels 102 and 104. Calculation of the vehicle speed from the rotation speeds of wheels 102 and 104 and calculation of the slip ratio of the rear wheel 104 are well known to a person of ordinary skill in the art.

After calculating the slip ratio S_cal of the rear wheel 104, the controller compares the calculated slip ratio S_cal with a limited reference slip ratio S_limit at step S334 to determine whether the calculated slip ratio is less than the reference slip ratio S_limit. Where the calculated slip ratio S_cal is less than the reference slip ratio S_limit, the controller 150 continues regenerative braking for the rear wheel 104 at step S336. However, where the calculated slip ratio S_cal is not less than the reference slip ratio S_limit, the controller 150 stops regenerative braking for the rear wheel 104 at step S338. Therefore, in this case, the 4WD-HEV 100 decelerates purely by a mechanical braking force caused by a hydraulic braking force.

As described above, continuation of regenerative braking may be interrupted based on the slip ratio S_cal of the rear wheel 104. Therefore, it may prevent deterioration of vehicle behavior of the 4WD-HEV 100 caused by excessive application of regenerative braking force to the rear wheel 104 while only the rear motor 114 is being regeneratively braked.

Subsequently at step S340, the controller 150 determines whether a vehicle speed has become 0 (zero). When the vehicle speed has become 0, the controller 150 executes a post-stop controlling step S370. At the post-stop controlling step S370, the controller 150 prevents regenerative braking of the rear motor 114 until the clutch 142 becomes engaged and the manual transmission is in a forward shift-speed. The post-stop controlling step S370 will be described later in further detail.

When the vehicle speed has not become 0 (zero), the controller 150 determines, at step S345, whether a brake operation of a driver has stopped a braking operation. Stopping of the brake operation of a driver may be determined on the basis of an output signal from the brake operation detector 220. In the case that the brake operation of a driver has not yet stopped, the controller 150 returns to the step S322 of calculating the target regenerative braking force FR1 of the rear motor 114. Therefore, even while the clutch 142 is disengaged, regenerative braking of the rear motor 114 may be continuously maintained in accordance with the brake operation of a driver. In the case where the brake operation of a driver has stopped, the controller 150 returns to the step S305 such that control of regenerative braking for next brake operation may become ready. The above description is mainly related to the case where the clutch 142 is not engaged in the step S310.

The following description is mainly related to a controlling process that the controller 150 executes in the case where the clutch 142 is engaged, that is, in the case where power is transmitted between the front motor 112 and the front wheel 102. In the case where the clutch 142 is engaged (S310-yes), firstly at step S352, the controller 150 calculates a target regenerative braking force FF2 of the front motor 112 and a target regenerative braking force FR2 of the rear motor 114 corresponding to the brake pedal operation of a driver. Then at step S355, the controller 150 regeneratively brakes the front and rear motors 112 and 114 on the basis of the calculated target regenerative braking force FF2 of the front motor 112 and the target regenerative braking force FR2 of the rear motor 114.

Subsequently, at step S360, the controller 150 detects the rotation speed of each of the front and rear wheels 102 and 104 through the front and rear wheel speed detectors 132 and 134, and calculates a vehicle speed based thereon. Subsequently, at step S362, the controller 150 determines whether a vehicle speed has become 0 (zero).

When the vehicle speed has become 0, the controller 150 executes a post-stop controlling step S370. As has been described above, at the post-stop controlling step S370, the controller 150 prevents regenerative braking of the rear motor 114 until the clutch 142 is engaged and the manual transmission is in a forward shift-speed. The post-stop controlling step S370 will be later described in further detail.

When the vehicle speed has not become 0 (zero), the controller 150 determines, at step S365, whether a brake operation of a driver has stopped. Stopping of the brake operation of a driver may be determined on the basis of an output signal from the brake operation detector 220.

In the case that the brake operation of a driver has not yet stopped, the controller 150 returns to the step S352 of calculating the target regenerative braking forces FF2 and FR2 of the front and rear motors 112 and 114. Therefore, while the clutch 142 is engaged, regenerative braking of both the front and rear motors 112 and 114 may be continuously maintained in accordance with the brake operation of a driver. In the case that the brake operation of a driver has stopped, the controller 150 returns to the step S305 such that control of regenerative braking for a next brake operation may become ready.

The post-stop controlling step S370 of the controller 150 after the vehicle speed has become 0 (zero) during the braking of the 4WD-HEV 100 is hereinafter described in detail.

Firstly at step S372, the controller 150 determines whether the clutch is engaged. In the case that the clutch 142 is engaged, the controller 150 determines, at step S374, whether a current shift-speed is either of neutral N speed or reverse R speed. In the case that the current shift-speed is neither the neutral N or the reverse R speed, that is, in the case that the current shift-speed, is a forward shift-speed such as first, second, third, or fourth speed, the controller 150 returns to the step S305 such that control of regenerative braking for the next brake operation may become ready.

In the case that the current shift-speed is either the neutral N or the reverse R speed, the controller 150 determines whether the current shift-speed is the neutral N speed at step S376.

In the case that the current shift-speed is found to be the neutral N speed, at the step S376, or in the case that the clutch 142 is found to be disengaged at the step S372, the controller 150 determines whether the vehicle speed remains at 0 (zero) at step S380.

In the case that the vehicle speed remains at 0, the controller 150 returns to the step S372 for determination of whether the clutch is engaged or disengaged. In the case that the vehicle speed is not 0 at the step S380, or in the case that the current shift-speed is not the neutral N speed at the step S376 (meaning that the current shift-speed is the reverse R speed), the controller 150 decelerates the 4WD-HEV 100 purely by the mechanical braking force in response to the brake operation of a driver at step S390.

The step S390 is hereinafter described in further detail. In the case that the vehicle speed has changed from 0 (S380-no), or in the case that the current shift-speed is a reverse R speed (S376-no), the controller 150 determines whether the 4WD-HEV 100 is brake-operated at step S392. In the case that the 4WD-HEV 100 is not brake-operated, the controller 150 returns to the step S372 for determination of whether the clutch is engaged or disengaged.

In the case that the 4WD-HEV 100 is brake-operated, the controller 150 maintains stopping of regenerative braking of the front and rear motors 112 and 114 at step S394. Therefore, in this case, the front and rear wheels 102 and 104 are applied purely with a mechanical braking force since the regenerative braking of the front and rear motors 112 and 114 has been stopped.

Subsequently at step S396, the controller 150 again detects the vehicle speed. Then, at step S398, the controller 150 determines whether the vehicle speed equals 0 or a brake operation of the 4WD-HEV 100 has been stopped. In the case that the vehicle speed has not become 0 and the brake operation is maintained, the controller returns to the step S394 such that the mechanical braking may be maintained. In the case that the vehicle speed has become 0 or in the case that the brake operation has been stopped, the controller 150 returns to the step S372, such that the post-stop controlling step S370 may be executed again.

According to an embodiment of the present invention, regenerative braking of front and rear motors may be controlled differently depending on whether the clutch is engaged or disengaged. In the case where the clutch is engaged, a regenerative braking force is applied to both the front and rear wheels such that a rate of energy reclamation may be increased.

In the case that the clutch is not engaged, the rear motor still applies with a regenerative braking force, and therefore, energy reclamation may also be enabled in this case. In the case that the clutch is not engaged, a smaller regenerative force is applied to the rear motor than in the case that the clutch is engaged. Therefore, vehicle dynamics of a four wheel drive electric vehicle under braking circumstances may become more stable.

During the regenerative braking for the case that the clutch is not engaged, the slip ratio of the rear wheel is controlled to remain smaller than a reference slip ratio. Therefore, vehicle dynamics of a four wheel drive electric vehicle under braking circumstances may become more stable.

The case that vehicle speed becomes 0 during braking of an electric vehicle is separately considered for regenerative braking. Therefore, regenerative braking of an electric vehicle may be optimized regardless of normal forward driving circumstances and driving circumstances in reverse and/or neutral speeds.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for controlling regenerative braking of a four wheel drive electric vehicle equipped with front and rear motors, the front motor being coupled with front wheels via a manual transmission having a clutch, the method comprising:
    determining whether the four wheel drive electric vehicle is braking;
    determining whether the clutch is engaged or disengaged while the four wheel drive electric vehicle is braking; and
    controlling regenerative braking of the front and rear motors based on whether the clutch is engaged or disengaged;
    wherein the controlling comprises regeneratively braking only the rear motor of the front and rear motors when the clutch is disengaged;
    wherein a first regenerative braking force on the rear motor when the clutch is disengaged is less than a second regenerative braking force on the rear motor when the clutch is engaged.

2. The method of claim 1, wherein the controlling further comprises regeneratively braking both the front and rear motors when the clutch is engaged.

3. The method of claim 1, wherein the controlling further comprises:
    calculating a slip ratio of a rear wheel when the clutch is disengaged;
    determining whether the slip ratio is less than a reference slip ratio; and
    stopping regenerative braking of the rear motor when the slip ratio of the rear wheel is greater than the reference slip ratio.

4. The method of claim 1, wherein the controlling further comprises determining whether a vehicle speed becomes zero during braking operation of the four wheel drive electric vehicle,
    wherein, when the vehicle speed of the four wheel drive electric vehicle becomes zero, the regenerative braking of the rear motor is prevented until the clutch is engaged and the manual transmission is in a forward shift-speed.

5. A system for controlling regenerative braking of a four wheel drive electric vehicle equipped with front and rear wheels and a brake apparatus for applying mechanical braking force to the front and rear wheels, the system comprising:

a front motor for applying both a driving force and a regenerative braking force to the front wheels;

a rear motor for applying both a driving force and a regenerative braking force to the rear wheels;

a manual transmission and a clutch interposed between the front motor and the front wheels;

a clutch engagement detector for detecting engagement of the clutch;

a brake operation detector for detecting operation of the brake apparatus; and a controller for controlling regenerative braking of the front and rear motors based on signals received from the clutch engagement and brake operation detectors, wherein the controller executes instructions for performing a method for controlling regenerative braking, the method comprising:

determining whether the four wheel drive electric vehicle is braking;

determining whether the clutch is engaged or disengaged when the four wheel drive electric vehicle is braking; and controlling regenerative braking of the front and rear motors based on whether the clutch is engaged or disengaged;

wherein the controlling regeneratively brakes only the rear motor of the front and rear motors when the clutch is disengaged;

wherein the regenerative braking force on the rear motor when the clutch is disengaged is less than the regenerative braking force on the rear motor when the clutch is engaged.

6. The system of claim 5, wherein the controlling regeneratively brakes both the front and rear motors when the clutch is engaged.

7. The system of claim 5, further comprising a front wheel speed detector for detecting the wheel speed of the front wheels and a rear wheel speed detector for detecting the wheel speed of the rear wheels, wherein the controlling of regenerative braking of the front and rear motors, comprises:

calculating a slip ratio of the at lest one of the rear wheels when the clutch is disengaged;

determining whether the slip ratio of the at least one rear wheel is less than a reference slip ratio; and stopping regenerative braking of the rear motor when the slip ratio of the rear wheel is greater than the reference slip ratio.

8. The system of claim 5, further comprising a shift-speed detector for detecting the shift-speed of the manual transmission, wherein the controlling of regenerative braking of the front and rear motors comprises determining whether a vehicle speed becomes zero during braking of the four wheel drive electric vehicle, wherein, when the vehicle speed of the four wheel drive electric vehicle becomes zero, the regenerative braking of the rear motor is prevented until the clutch becomes engaged and the manual transmission is in a forward shift-speed.

* * * * *